US009099125B1

(12) United States Patent
Hattori et al.

(10) Patent No.: US 9,099,125 B1
(45) Date of Patent: Aug. 4, 2015

(54) CURRENT-PERPENDICULAR-TO-THE-PLANE (CPP) MAGNETORESISTIVE (MR) SENSOR STRUCTURE WITH STACKED SENSORS FOR MINIMIZATION OF THE EFFECT OF HEAD SKEW

(71) Applicant: HGST Netherlands B.V., Amsterdam (NL)

(72) Inventors: Masashi Hattori, Odawara (JP);
Kenichi Meguro, Kaiseimachi (JP);
Kouichi Nishioka, Hiratsuka (JP);
Takashi Wagatsuma, Odawara (JP);
Nobuo Yoshida, Hiratsuka (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/513,320

(22) Filed: Oct. 14, 2014

(51) Int. Cl.
*G11B 5/39* (2006.01)
*G11B 5/115* (2006.01)
*G11B 5/265* (2006.01)

(52) U.S. Cl.
CPC .............. *G11B 5/3912* (2013.01); *G11B 5/265* (2013.01)

(58) Field of Classification Search
CPC ............ G11B 5/10; G11B 5/11; G11B 5/115; G11B 5/265; G11B 5/31; G11B 5/33; G11B 5/332; G11B 5/39; G11B 5/3903; G11B 5/3906; G11B 5/3912; G11B 5/3945; G11B 5/3948; G11B 5/3958; G11B 5/3964

USPC .............. 360/314, 315, 316, 319, 324, 324.1, 360/324.11, 324.12, 324.2, 121
See application file for complete search history.

(56) References Cited

U.S. PATENT DOCUMENTS

| | | | |
|---|---|---|---|
| 7,271,970 B2 * | 9/2007 | Tsuchiya | 360/61 |
| 7,453,671 B1 * | 11/2008 | Nibarger et al. | 360/316 |
| 7,751,148 B1 * | 7/2010 | Alstrin et al. | 360/241.1 |
| 8,711,517 B2 | 4/2014 | Erden et al. | |
| 8,786,987 B2 * | 7/2014 | Edelman et al. | 360/324.12 |
| 8,824,106 B1 * | 9/2014 | Garfunkel et al. | 360/316 |
| 8,873,204 B1 * | 10/2014 | Gao et al. | 360/319 |
| 8,891,207 B1 * | 11/2014 | Li et al. | 360/316 |
| 2013/0286502 A1 * | 10/2013 | Erden et al. | 360/76 |

* cited by examiner

*Primary Examiner* — Jefferson Evans
(74) *Attorney, Agent, or Firm* — Thomas R. Berthold (57) ABSTRACT

A two-dimensional magnetic recording (TDMR) multi-sensor read head has three stacked sensors separated by magnetic shields. The lower sensor is the primary sensor that is always aligned with the target track. The middle sensor is spaced laterally from the lower sensor a distance substantially equal to the track pitch (TP). The upper sensor is aligned with the lower sensor. The spacing D between the lower and upper sensors is selected to be related to TP and a maximum skew angle, where the skew angle is the angle between a line orthogonal to the sensor and the data track that varies with radial position of the head. The read head is connected to circuitry that selects two of the three sensors to be the active sensors depending on the radial position of the head and thus the skew angle of the head.

12 Claims, 9 Drawing Sheets

CURRENT-PERPENDICULAR-TO-THE-PLANE (CPP) MAGNETORESISTIVE (MR) SENSOR STRUCTURE WITH STACKED SENSORS FOR MINIMIZATION OF THE EFFECT OF HEAD SKEW

BACKGROUND OF THE INVENTION

1. Field of the Invention

The invention relates generally to a current-perpendicular-to-the-plane (CPP) magnetoresistive (MR) sensor structure for two-dimensional magnetic recording (TDMR).

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu) or silver (Ag). One ferromagnetic layer adjacent to the spacer layer has its magnetization direction fixed, such as by being pinned by exchange coupling with an adjacent antiferromagnetic layer, and is referred to as the reference or pinned layer. The other ferromagnetic layer adjacent to the spacer layer has its magnetization direction free to rotate in the presence of an external magnetic field and is referred to as the free layer. With a sense current applied to the sensor, the rotation of the free-layer magnetization relative to the pinned-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP sensor is a magnetic tunnel junction sensor, also called a tunneling MR or TMR sensor, in which the nonmagnetic spacer layer is a very thin nonmagnetic tunnel barrier layer. In a CPP-TMR sensor the amount of tunneling current through the layers depends on the relative orientation of the magnetizations in the two ferromagnetic layers. In a CPP-TMR read head the nonmagnetic spacer layer is formed of an electrically insulating material, such as $TiO_2$, MgO or $Al_2O_3$.

A proposed technology that uses multiple CPP-MR sensors is two-dimensional magnetic recording (TDMR). In TDMR, multiple sensors that are located on a single structure access the same or adjacent data tracks to obtain signals that are processed jointly. This allows the data tracks to be placed closer together, resulting in an increase in areal data bit density. In addition to increasing areal density, TDMR may provide an increased readback data rate if data from multiple data tracks are read concurrently. A structure with multiple stacked read sensors for TDMR is described in US 2013/0286502 A1.

Each of the individual CPP-MR sensors in a TDMR read head structure is required to be located between two shields of magnetically permeable material that shield the sensors from recorded data bits that are neighboring the data bit being read. During readback, the shields ensure that each sensor reads only the information from its target bits.

In a TDMR sensor structure, such as a structure with two or more stacked sensors, a problem arises due to skew of the sensors at the inside diameter (ID) and outside diameter (OD) regions of the disk. This is because the sensors are supported on a radial actuator that causes the sensors to make an arcuate path across the disk. At the mid-diameter (MD) regions of the disk the skew angle θ (the angle between a line orthogonal to the sensor and the data track) is near zero. However, at the ID and OD regions the skew angle can be up to 15-20 degrees, depending on the geometry of the actuator and disk. This may result in the sensors being misaligned from their target tracks. Reducing the spacing between the stacked sensors can reduce the skew effect; however the magnetic shields must have a minimum thickness to be effective, which limits how close the sensors can be spaced.

What is needed is a stacked CPP-MR sensor structure for TDMR that minimizes the effect of head skew.

SUMMARY OF THE INVENTION

Embodiments of this invention relate to a TDMR multi-sensor read head that allows for the reading of adjacent tracks without the adverse effects of high head skew when the head is in the inside diameter (ID) and outside diameter (OD) regions of the disk. The read head has three stacked sensors separated by magnetic shields. The lower or first sensor is located on the bottom magnetic shield S1 and is the primary sensor that is always aligned with the target track. A second magnetic shield S2 is located on the first sensor. The middle or second sensor is located on S2 and is spaced laterally from the first sensor a distance substantially equal to the track pitch (TP). A third magnetic shield S3 is located on the second sensor and is aligned above the first sensor. The upper or third sensor is located on S3 and is aligned with the first sensor. The upper or fourth magnetic shield S4 is located on the third sensor. The spacing D between the first and third sensors in the direction orthogonal to the planes of the sensors is selected to be related to TP and a maximum skew angle ($\theta_m$). The spacing D between the first and second sensors in the direction orthogonal to the planes of the sensors is preferably D/2.

The read head is connected to circuitry that selects two of the three sensors to be the active sensors depending on the radial position of the head and thus the skew angle θ of the head. The first and second sensors are selected as the active sensors when the head is located in the mid-diameter (MD) region of the disk. The first and third sensors are selected as the active sensors when the head is located in the ID and OD regions of the disk.

For a fuller understanding of the nature and advantages of the present invention, reference should be made to the following detailed description taken together with the accompanying figures.

DETAILED DESCRIPTION OF THE INVENTION

Figure 1:
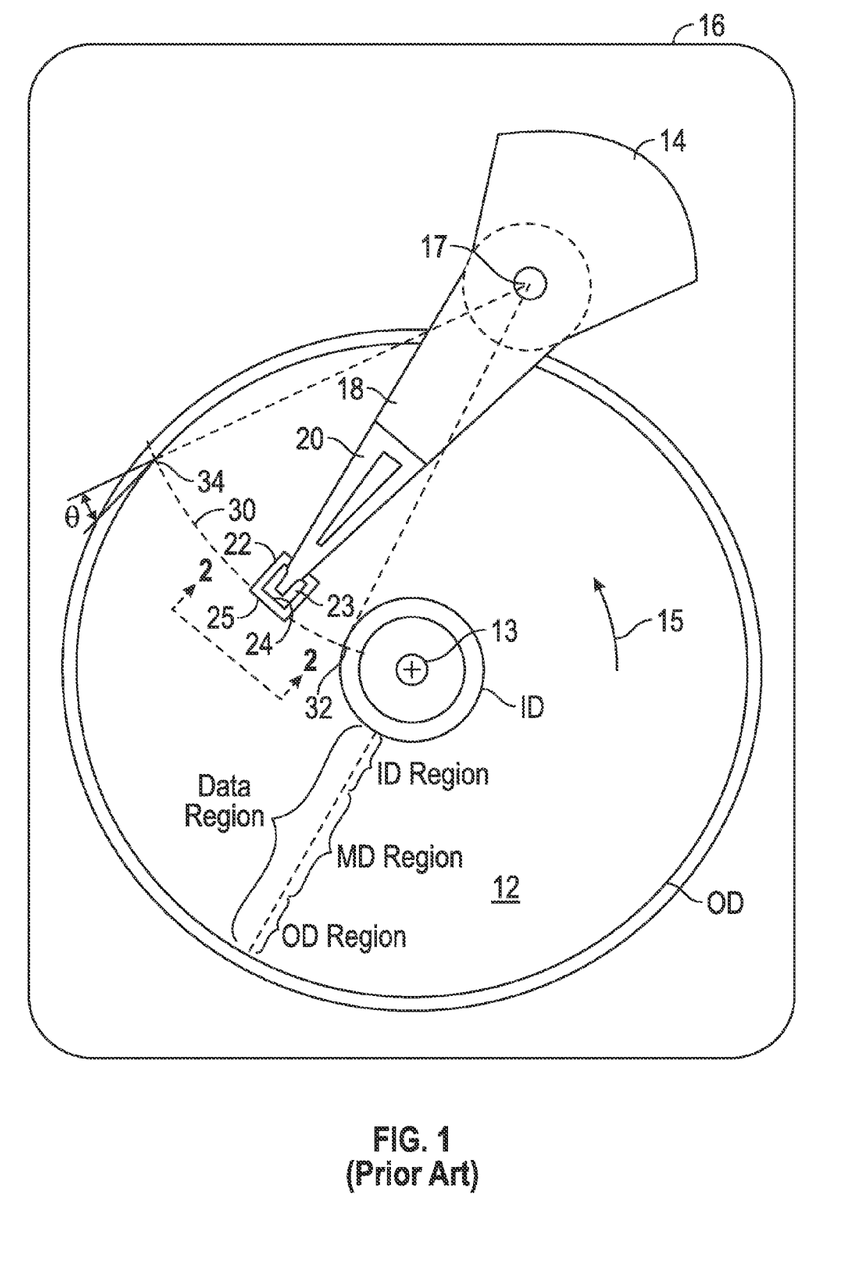
FIG. 1 is a schematic top view of a conventional magnetic recording hard disk drive with the cover removed that can be used for two-dimensional magnetic recording (TDMR).

The CPP magnetoresistive (MR) sensor structure of this invention has application for use in a magnetic recording disk drive, the operation of which will be briefly described with reference to FIGS. 1-3. FIG. 1 is a block diagram of a conventional magnetic recording hard disk drive that can function for two-dimensional magnetic recording (TDMR). The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

The rotary actuator causes the head 24 to make an arcuate path 30 across the disk 12 between the inside diameter (ID) and outside diameter (OD) of the data region of the disk 12. Line 32 represents the position of the head 24 at the ID and line 34 represents the position of the head 24 at the OD. The skew angle θ is defined as the angle between an orthogonal to the head 24 (or the trailing surface 25) and the data track, as depicted at line 34 at the OD. Because of the arcuate path 30, the skew angle θ varies with radial position of the head 24 and is zero at some point in the mid-diameter (MD) region and absolute maximums at the ID and OD.

Figure 2:
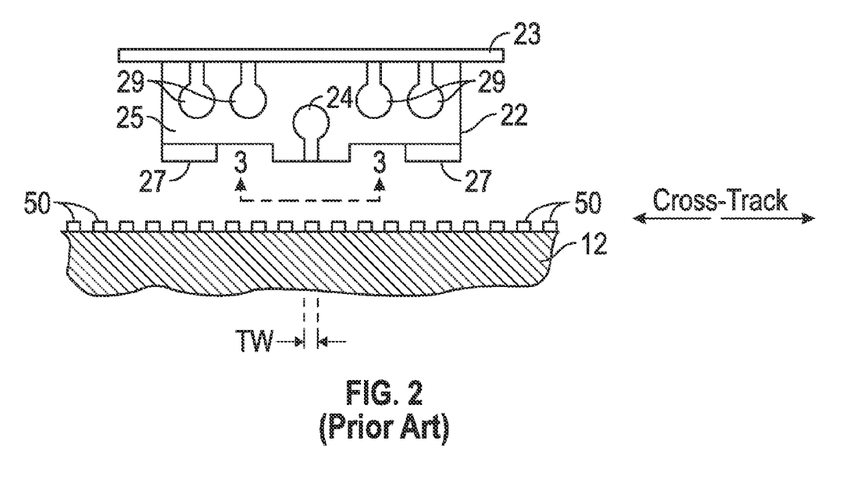
FIG. 2 is an enlarged end view of a section of the disk and a slider with a sensor structure capable of TDMR taken in the direction 2-2 in FIG. 1 according to the prior art.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 22 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
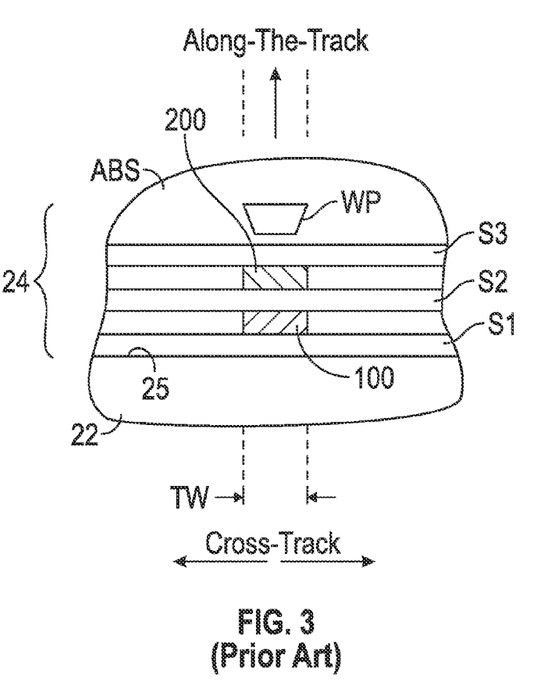
FIG. 3 is a view in the direction 3-3 of FIG. 2 and shows the ends of the write head and TDMR read head structure as viewed from the disk according to the prior art.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22, using well-known thin film head fabrication techniques. The write head includes a perpendicular magnetic write pole (WP) and may also include trailing and/or side shields (not shown).

The read head portion of read/write head 24 is depicted as a sensor structure of stacked multiple CPP-MR read sensors 100, 200 for use in a disk drive with TDMR. In this example both read sensors 100, 200 are aligned with one another (vertically in FIG. 3) so as to read the same data track with trackwidth TW. Lower read sensor 100 is located between two magnetic shields, lower shield S1 and center shield S2. Upper read sensor 200 is also located between two magnetic shields, center shield S2 and upper shield S3. The shields S1, S2, S3 are formed of magnetically permeable material and may be electrically conductive so they can function as the electrical leads to the read sensors 100 and 200. The shields function is to shield the read sensors 100 and 200 from recorded data bits that neighbor the data bit being read. FIG. 3 is not to scale because of the difficulty in showing very small dimensions. Typically the lower and upper shields S1 and S3, respectively, may each be up to several microns thick in the along-the-track direction, as compared to the total thickness of each read sensor 100, 200 in the along-the-track direction, which may be in the range of about 20 to 40 nm.

Figure 4:
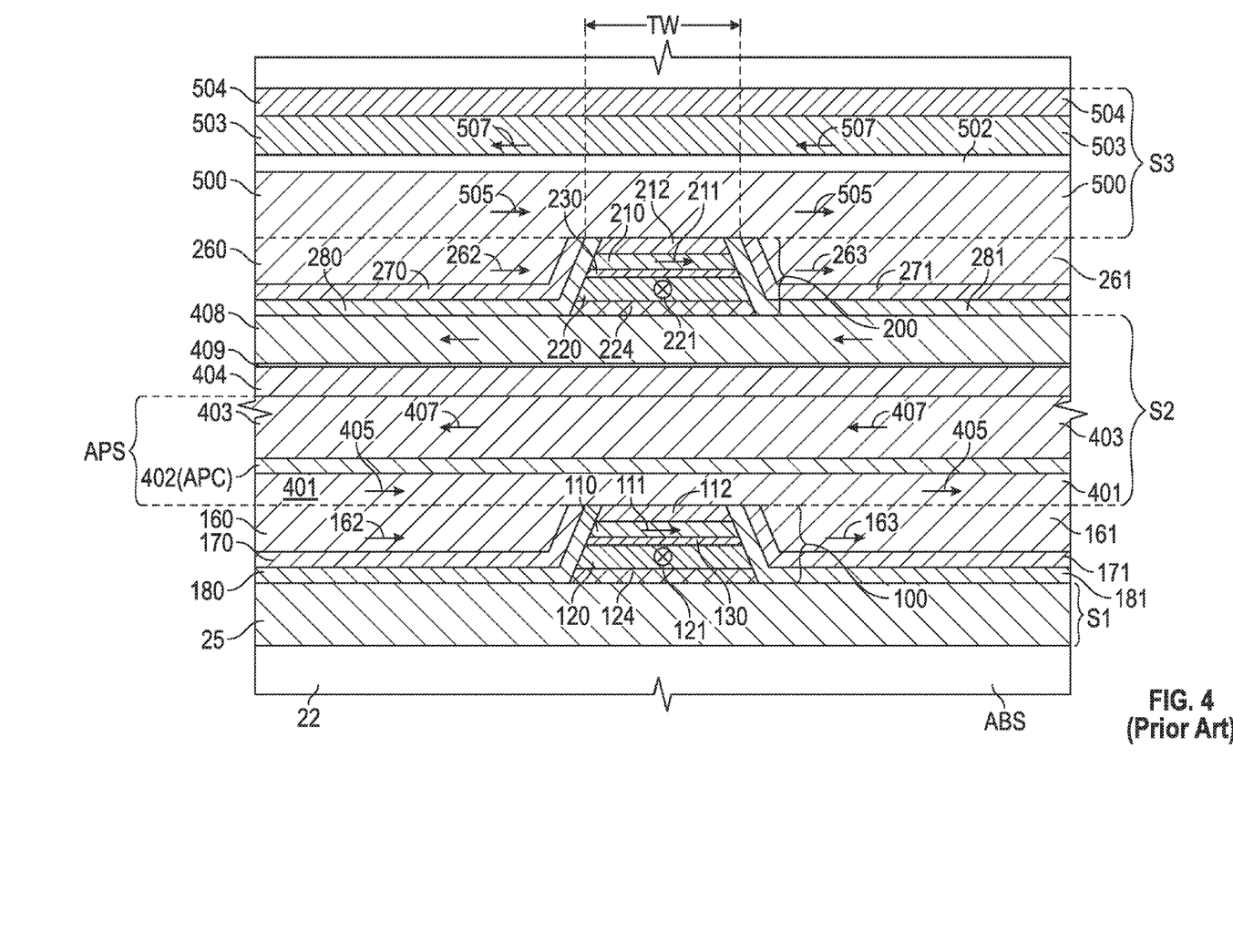
FIG. 4 is view of the air-bearing surface (ABS) showing the layers making up one type of a stacked CPP-MR sensor structure for TDMR according to the prior art as would be viewed from the disk.

FIG. 4 is a view of the ABS showing the layers making up one type of a stacked CPP-MR sensor structure according to the prior art as would be viewed from the disk. The lower sensor 100 is generally aligned along the same TW as upper sensor 200. Lower sensor 100 is located on lower or bottom shield S1, which is located on the slider substrate, i.e., the trailing surface 25 of slider 22 (see FIG. 3). The sensor 100 layers include a reference or pinned ferromagnetic layer 120 having a fixed magnetic moment or magnetization direction 121 oriented orthogonal to the ABS (into the page), a free ferromagnetic layer 110 having a magnetic moment or magnetization direction 111 oriented substantially parallel to the ABS but that can rotate in the plane of layer 110 in response to transverse external magnetic fields from the disk, and a nonmagnetic spacer layer 130 between the pinned layer 120 and free layer 110. The CPP-MR sensor 100 may be a CPP GMR sensor, in which case the nonmagnetic spacer layer 130 would be formed of an electrically conducting material, typically a metal like Cu or Ag. Alternatively, the CPP-MR sensor 100 may be a CPP tunneling MR (CPP-TMR) sensor, in which case the nonmagnetic spacer layer 130 would be a tunnel barrier formed of an electrically insulating material, like $TiO_2$, MgO or $Al_2O_3$. The pinned layer 120 may have its magnetization direction pinned substantially orthogonal to the ABS by being exchange-coupled to an antiferromagnetic (AF) layer 124. The AF layer 124 is typically a Mn alloy, e.g., PtMn, NiMn, FeMn, IrMn, PdMn, PtPdMn or RhMn. Pinned layer 120 may be a simple pinned or an antiparallel pinned structure. A nonmagnetic capping layer 112, which may be a single layer or multiple layers of different materials, such as Ru, Ta and Ti, located above the free ferromagnetic layer 110 provides corrosion protection, and adjusts the free layer to shield spacing.

In the presence of an external magnetic field in the range of interest, i.e., magnetic fields from recorded data on the disk, the magnetization direction 111 of free layer 110 will rotate while the magnetization direction 121 of pinned layer 120 will remain fixed and not rotate. Thus when a sense current is applied from top shield perpendicularly through the sensor 100 layers, the magnetic fields from the recorded data on the disk will cause rotation of the free-layer magnetization 111 relative to the pinned-layer magnetization 121, which is detectable as a change in electrical resistance.

The structure, function and method of fabrication of CPP-MR sensor 100 are well-known and thus not described in detail in this application. Upper sensor 200 with corresponding 200 series numbered items is substantially identical in structure and function to sensor 100.

Side shields 160, 161 of soft magnetic material are formed outside of sensor 100, near the side edges of the sensor 100, particularly near the side edges of free layer 110. The side shields 160, 161 have magnetizations 162, 163, respectively, and thus longitudinally bias the magnetization 111 of free layer 110. Seed layers 170, 171 are located below the side shields 160, 161 and insulating layers 180, 181 are located below the seed layers 170, 171. The seed layers 170, 171 and side shields 160, 161 are electrically insulated from side edges of sensor 100 by electrically insulating layers 180, 181, which are typically formed of alumina ($Al_2O_3$), a silicon nitride ($SiN_x$) or another metal oxide like a Ta oxide or a Ti oxide. The side shields 160, 161 are formed of "soft" magnetic material, meaning material that can be easily magnetized and demagnetized at low magnetic fields. The soft magnetic material is preferably an alloy comprising Ni and Fe with permeability ($\mu$) preferably greater than 100. The side shields may be formed of any of the well-known materials used for conventional magnetic shields, for example NiFe alloys wherein Ni is present in the NiFe alloy in an amount between 40 and 99 atomic percent (at.%). Alternatively, other soft ferromagnetic materials may be used, like NiFeCr, NiFeMo, CoZrTa, CoZrNb and CoFeZr alloys. More specific compositions for the side shield material include $(NiFe_x)Mo_y$ and $(NiFe_x)Cr_y$, where x is between 1 and 25 and y is between 1 and 8, where the subscripts are in atomic percent.

Upper sensor 200 comprises antiferromagnetic layer 224, pinned layer 220 with its magnetization 221 orthogonally pinned to the ABS, spacer layer 230, free layer 210 with its magnetization 211 oriented substantially parallel to the ABS but free to rotate, and a nonmagnetic cap 212. Upper sensor 200 also includes side shields 260, 261 with magnetizations 262, 263; seed layers 270, 271; and insulating layers 280, 281. The side shields 260, 261 may have the same structure, composition and function as previously described side shields 160, 161.

Center shield S2 is a laminated shared shield between lower sensor 100 and upper sensor 200. Shared center shield S2 includes a lower antiparallel structure (APS) comprising soft magnetic layers 401, 403 antiferromagnetically coupled by antiparallel coupling (APC) layer 402, and antiferromagnetic (AF) pinning layer 404 exchange coupled to layer 403. The APC layer 402 is typically Ru, Ir, Rh, Cr or alloys thereof with a thickness chosen to induce AF coupling between the layers 401, 403. A typical thickness of the APC is between about 7-9 Å, but the optimum thickness will depend on the composition of the magnetic materials chosen for layers 401 and 403 on both sides of the APC. The AF layer 404 is preferably IrMn (where Mn is between about 70 and 85 atomic percent), or any other known AF material, like PtMn, NiMn, FeMn, PdMn, PtPdMn, or RhMn. As a result of the antiferromagnetic coupling across APC layer 402 the layers 401, 403 have their respective magnetizations 405, 407 oriented antiparallel. Center shield S2 also includes a soft magnetic layer 408 below upper sensor 200 and a nonmagnetic decoupling layer 409 that separates layer 408 from AF layer 404. Because lower sensor 100 utilizes soft side shields 160, 161, layer 401 of center shield S2 is required to have a relatively fixed magnetization 405 to assist in stabilizing the magnetizations 162, 163 of side shields 160, 161, respectively. Thus AF pinning layer 404 is required to pin the magnetization 407 of layer 403 substantially parallel to the ABS, which results in the relatively fixed magnetization 405 of layer 401 due to antiferromagnetic coupling across APC layer 402 and thus in stabilizing the magnetizations 162, 163 of the side shields 160, 161, substantially parallel to the ABS as well.

Upper shield S3 is magnetically connected to side shields 260 and 261 and includes an antiparallel structure (APS) comprising soft magnetic layers 500, 503 antiferromagnetically coupled by antiparallel coupling (APC) layer 502, and antiferromagnetic (AF) pinning layer 504 exchange coupled to layer 503. As in the APS for S2, APC layer 502 is typically Ru, Ir, Rh, Cr or alloys thereof with a thickness chosen to induce AF coupling between the layers 500, 503 with typical thickness of the APC is between about 7-9 Å, but the optimum thickness will depend on the composition of the magnetic materials chosen for layers 500 and 503 on both sides of the APC. As a result of the antiferromagnetic coupling across APC layer 502 the layers 500, 503 have their respective magnetizations 505, 507 oriented antiparallel. The AF pinning layer 504 is required to pin the magnetization 507 of layer 503 substantially parallel to the ABS, which results in the relatively fixed magnetization 505 of layer 500 due to antiferromagnetic coupling across APC layer 502 and thus in stabilizing the magnetizations 262, 263 of the side shields 260, 261, substantially parallel to the ABS as well.

The sensor structure of FIG. 4 is depicted with APS structures as part of the center shield S2 and the top shield S3. However, a "simple" or single pinned structure is also possible for both structures in which APC layer 402 is not required and layers 401, 403 are replaced by a single soft magnetic layer which has its magnetization pinned by AF layer 404 and APC layer 502 is not required and layers 500 and 503 are replaced by a single soft magnetic layer which has its magnetization pinned by AF layer 504.

As is well known in the art the soft ferromagnetic material for use in shields S1, S2 and S3 may be a NiFe alloy, for example wherein Ni is present in the NiFe alloy in an amount between 40 and 99 atomic percent (at.%). Alternatively, other soft ferromagnetic materials may be used, like NiFeCr, NiFeMo, CoZrTa, CoZrNb and CoFeZr alloys.

Figure 5:
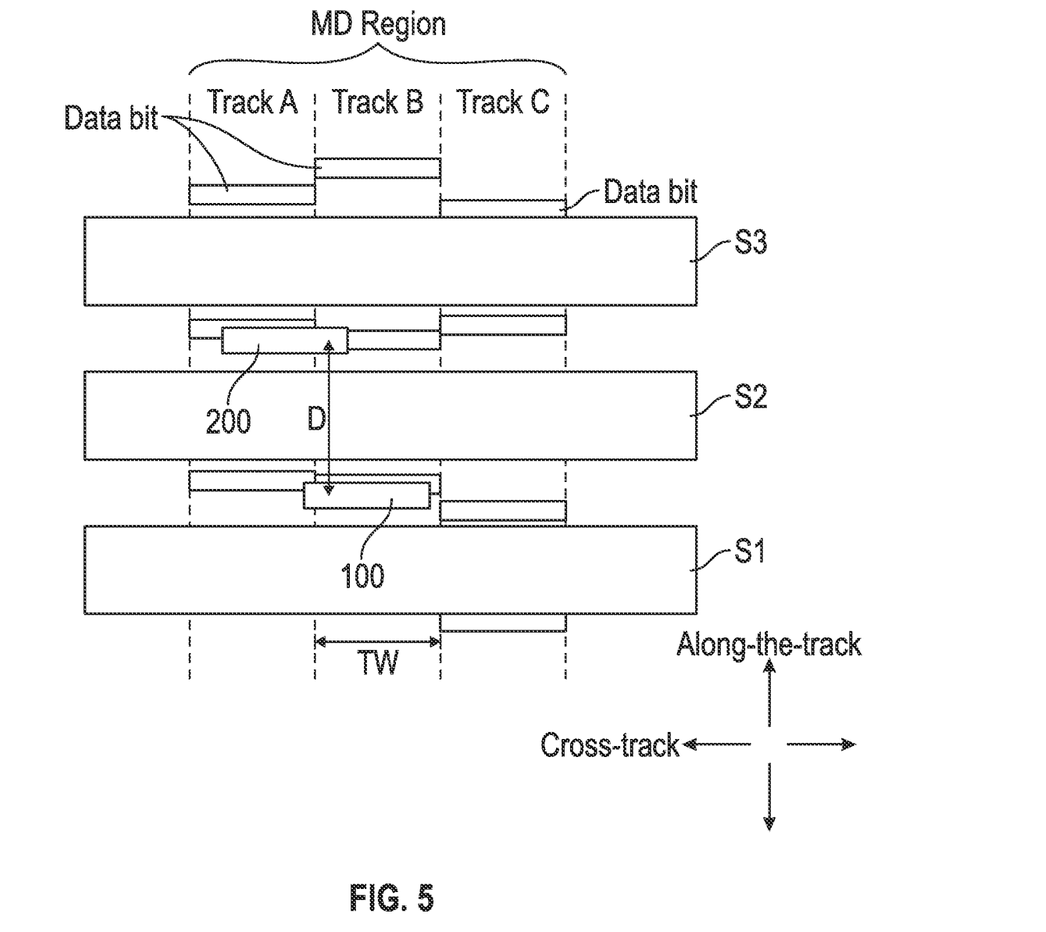
FIG. 5 is a schematic showing a multi-sensor read head with two sensors laterally offset from each other to read different portions of the same track, or to read separate tracks.

FIGS. 3 and 4 illustrate an example where the stacked sensors 100, 200 are aligned vertically to read the same data track. In one application, the readback signals from the two sensors may be processed to double the signal for the same relative amount of electronic noise, and thus increase the signal-to-noise ratio (SNR). However, sensors 100 and 200 may also be laterally offset from each other to read different portions of the same track, or to read separate tracks. This is depicted schematically in FIG. 5. In FIG. 5, the sensors are located at the MD (where θ is zero) and are spaced apart in the along-the-track direction a distance "d". Sensor 100 is generally aligned to read primarily target track B, and sensor 200 is spaced laterally (the cross-track direction) and aligned to read primarily adjacent track A.

Figure 6:
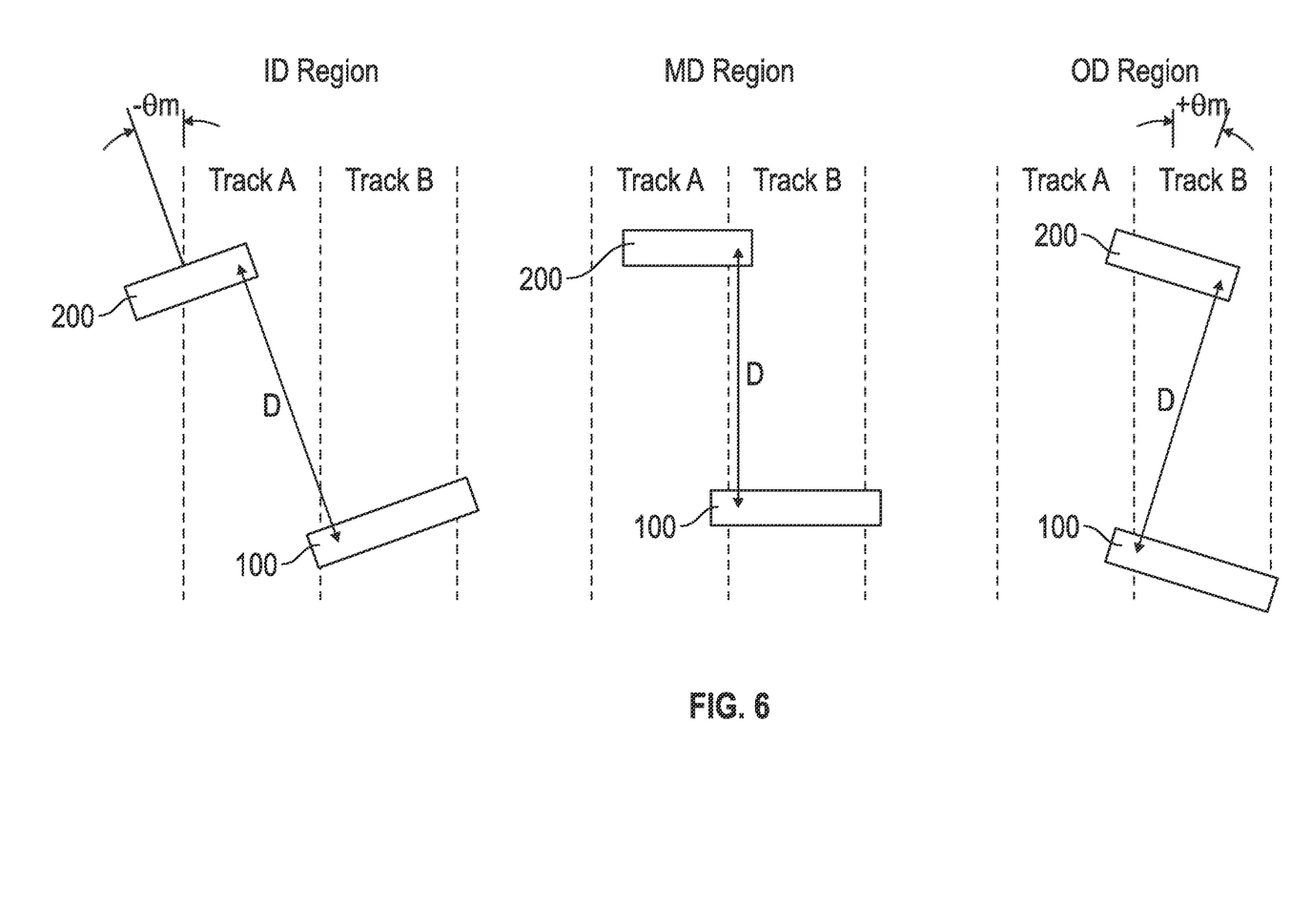
FIG. 6 is a schematic illustrating the problem of head skew at the inside diameter (ID) and outside diameter (OD) regions of the disk.

When the stacked sensors are designed to read adjacent tracks a problem arises due to skew of the sensors in the ID and OD regions. This is depicted in FIG. 6. The lower sensor 100 is designed to read primarily the signal from track B while upper sensor 200 is designed to read primarily the signal from adjacent track A, as shown when the sensors are near the MD of the data region. However, at the OD region sensor 200 has been shifted as a result of skew $+\theta_m$, so that it now reads the signal from track B instead of adjacent track A. At the ID region, sensor 200 has been shifted as a result of skew $-\theta_m$, so that it now reads only a portion of track A. One solution would appear to be to reduce the along-the-track spacing "d". However, "d" cannot be reduced because of the required thickness of shield S2 (FIG. 5).

Figure 7A:
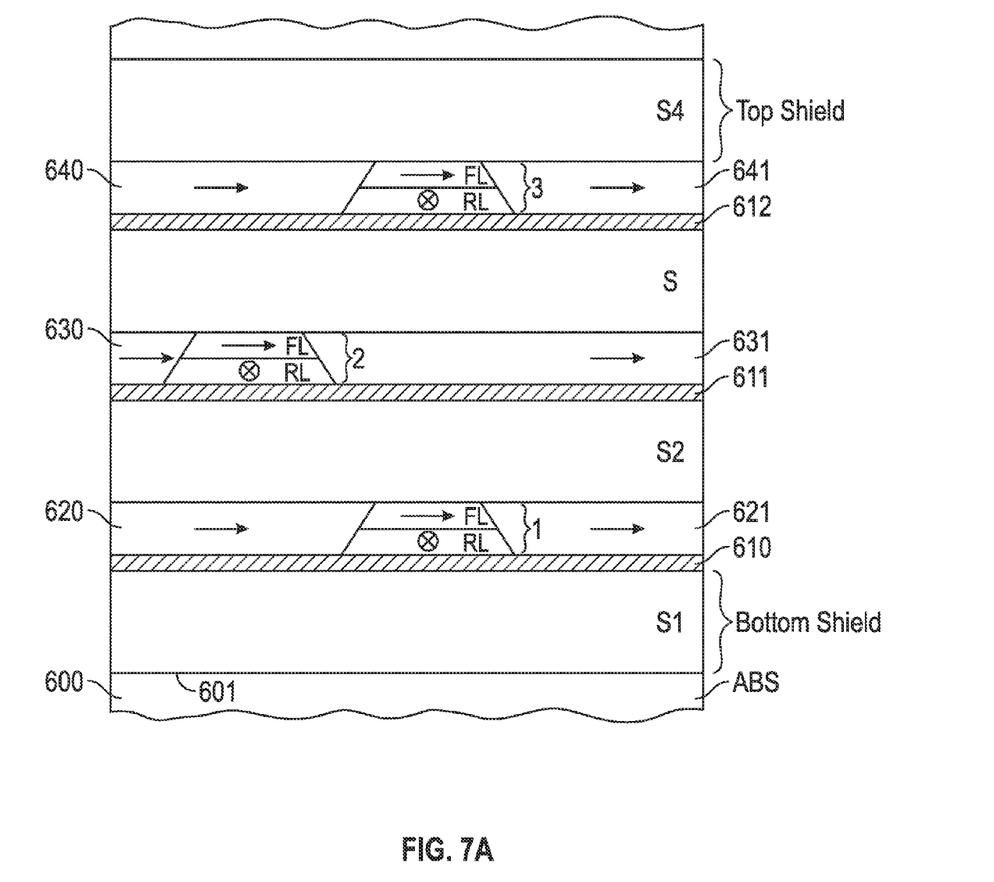
FIG. 7A is a view of the ABS showing the layers making up the stacked CPP-MR multi-sensor structure according to an embodiment of the invention as would be viewed from the disk.
Figure 7B:
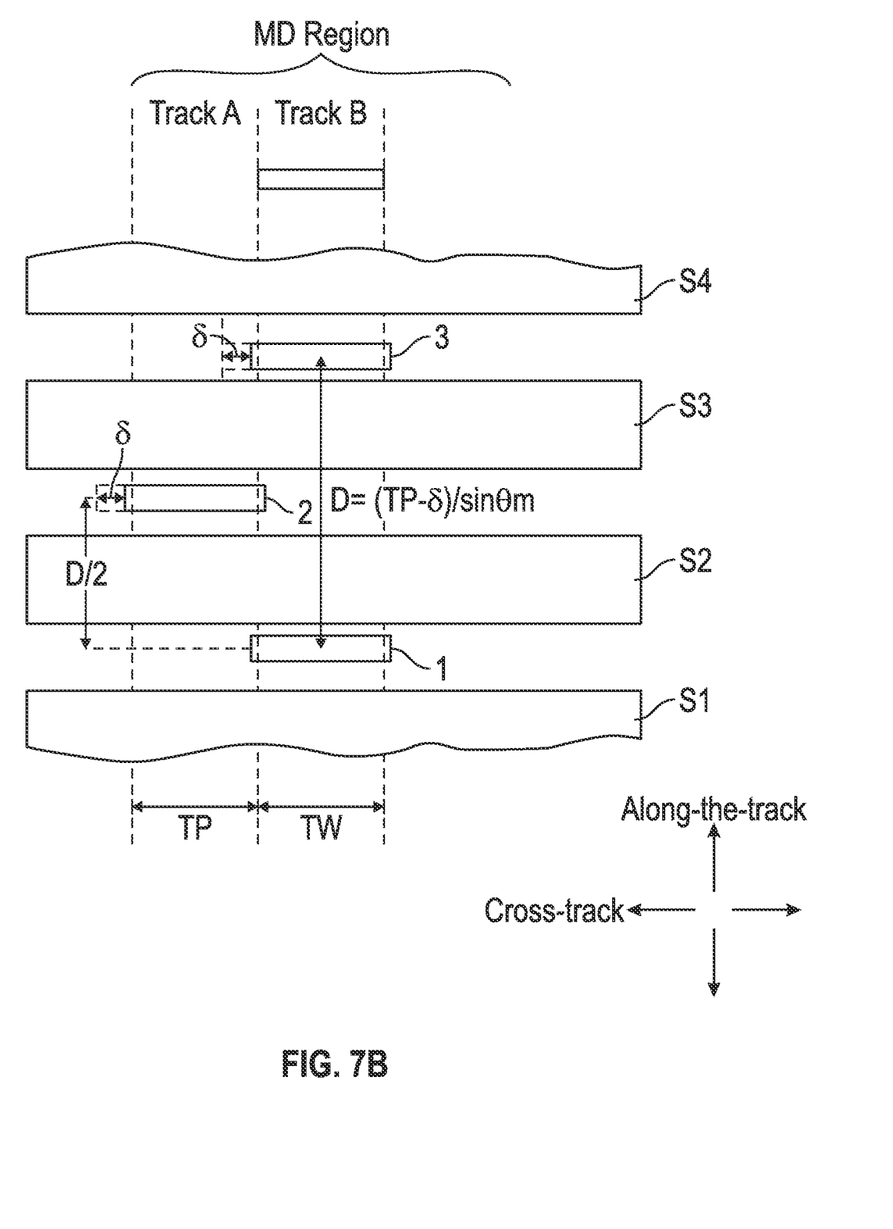
FIG. 7B is a schematic showing the alignment of the three sensors relative to one another and to the data tracks according to an embodiment of the invention.

An embodiment of the invention is a stacked multi-sensor read head that allows for the reading of adjacent tracks without the adverse effects of high skew in the ID and OD regions. FIG. 7A is a view of the ABS showing the layers making up the stacked CPP-MR multi-sensor structure according to an embodiment of the invention as would be viewed from the disk. FIG. 7A shows three stacked sensors 1, 2, 3 and their magnetic shields S1, S2, S3 and S4. The sensors and shields may be fabricated in substantially the same manner and of the same materials as described for the prior art stacked multi-sensor read head of FIG. 4, with the primary difference being the geometric relationship between the three sensors. Sensor 1 is located on lower magnetic shield S1 which is formed on the trailing surface 601 of the slider 600. Shield S2 is located on sensor 1, sensor 2 is located on S2, shield S3 is located on sensor 2, sensor 3 is located on S3, and upper shield S4 is located on sensor 3. Shield S1 serves as the bottom magnetic shield and shield S4 serves as the top magnetic shield for the multi-sensor structure. Each of sensors 1, 2 and 3 includes a free ferromagnetic layer (FL) and a pinned or reference layer (RL). Insulating layers 610, 611 and 612 are located between the respective sensors 1, 2 and 3 and the respective shields on which the are formed. Side shields of soft magnetic material may be formed outside of each sensor near the side edges of the free layer and electrically insulated from the sensor side edges. This is shown by side shields 620, 621 for sensor 1, side shields 630, 631 for sensor 2, and side shields 640, 641 for sensor 3. The side shields have magnetizations, as shown by the horizontal arrows, that longitudinally bias the magnetizations of the free layers. FIG. 7B is a schematic showing the alignment of the sensors relative to one another and to the data tracks. Sensor 3 is aligned with sensor 1 in the along-the-track direction (orthogonal to the planes of the sensors and shields) within a location accuracy or tolerance δ. Sensor 2 is spaced laterally in the cross-track direction (parallel to the planes of the sensors and shields) from sensor 1 a distance equal to the track pitch (TP), i.e., the cross-track spacing of the tracks, within a tolerance δ. Thus the lateral spacing between sensors 2 and 1 is a distance X=TP−δ so that if the sensors are precisely spaced X=TP. Typically TP is equal to the trackwidth (TW). Sensor 3 is spaced a distance D from sensor 1 in the along-the-track direction. The distance D is given by the following equation:

$$D = (TP - \delta)/\sin \theta_m \qquad \text{Equation (1)}$$

wherein $\theta_m$ is a selected maximum value of the skew angle θ. The term $\theta_m$ may be the absolute maximum value of θ, i.e., the value when the head is at the ID or OD, but may also be the value of θ when the head is at some radial position within the ID or OD regions. Sensor 2 is spaced from sensor 1 in the along-the track direction preferably by a distance D/2. The TP may be in the range of 25 to 50 nm for more advanced disk drives. Since shields S2 and S3 may be composed of 2 to 3 soft magnetic layers, with each soft magnetic layer thickness needing to be at least the minimum bit length of the recorded media (i.e., less than about 10 nm in more advanced disk drives), each of the shields S2 and S3 may have a thickness in the range of about 25 to 35 nm. A typical value of δ may be less than TP/4. Ideally sensor 3 is precisely aligned with sensor 1 in which case the value of D reduces to TP/sin $\theta_m$. Thus by way of example for a TDMR disk drive where $\theta_m$ is 15 degrees and TP is 25 nm with δ=0, D is 97 nm. In this example each sensor 1, 2, 3 thickness is assumed to be 15 nm so the shields S2 and S3 would each have a thickness of about 34 nm (34 nm=(97−(2*15))/2). Each of S2 and S3 is thick enough to function as a magnetic shield.

The sensors 1, 2, 3 may all have substantially the same cross-track width or different cross-track widths. The cross-track widths may be less than TP or greater than TP. The width of the individual sensors is selected based on the desired manner in which the readback signals are intended to be processed.

Figure 8:
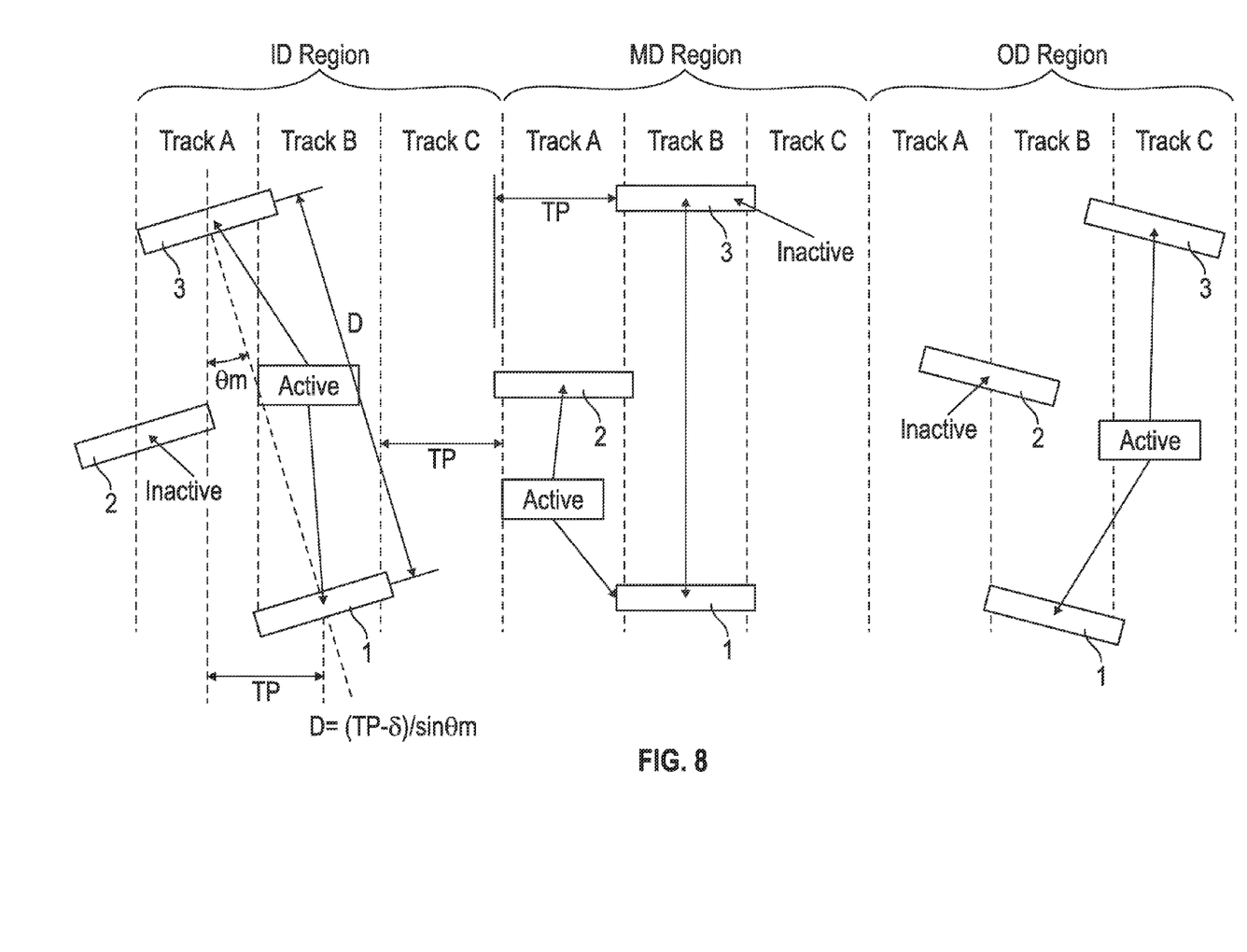
FIG. 8 is a schematic illustrating the minimization of head skew for the multi-sensor read head according to the invention.

FIG. 8 is a schematic illustrating how the multi-sensor read head of FIGS. 7A-7B minimizes the affect of high skew. The lower sensor 1 is designed to read primarily the signal from track B while middle sensor 2 is designed to read primarily the signal from adjacent track A, as shown when the sensors are near the MD of the data region. At the MD region only sensors 1 and 2 are active and target track B and adjacent track A are read. At the OD region upper sensor 3 has been shifted as a result of skew, so that it now reads the signal from track C, while middle sensor 2 has been shifted away from track A. At the OD region only sensors 1 and 3 are active and target track B and adjacent track C are read. At the ID region upper sensor 3 has been shifted as a result of skew, so that it now reads the signal from track A, while middle sensor 2 has been shifted away from track A. At the ID region only sensors 1 and 3 are active and target track B and adjacent track A are read. FIG. 8 also shows in the ID region the skew angle $\theta_m$ as the angle between the data track and a line orthogonal to the sensor 3, and the geometric derivation of the distance D.

Figure 9:
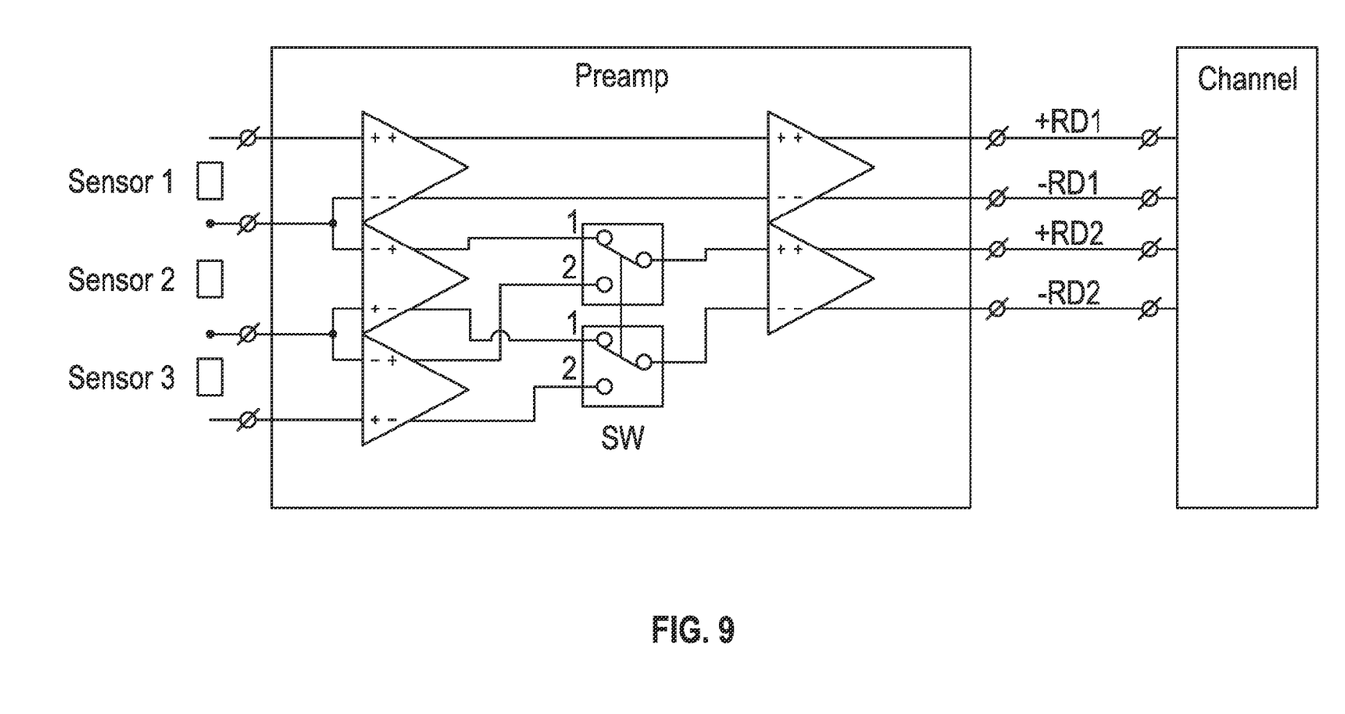
FIG. 9 is a block diagram of the circuitry for selecting two of the three sensors as the active sensors, depending on the radial position of the head, according to an embodiment of the invention.

FIG. 9 is a block diagram illustrating the circuitry for selecting the sensors of the multi-sensor read head according to an embodiment of the invention. The signals from all three sensors are input to the disk drive's preamplifier. However, only two signals (+RD1 and −RD1) and (+RD2 and −RD2) and then sent to the disk drive channel where they are processed into the readback data. A switch (SW) is located in the preamp. Sensor 1 is the main sensor and is always an active sensor that provides +RD1 and −RD1. When the head is at a radial position within the MD region, SW is set to position 1, so that the signal from sensor 2 provides +RD2 and −RD2. When the head is at a radial position within either the ID or OD regions, SW is set to position 2, so that the signal from sensor 3 provides +RD2 and −RD2. The ranges for the ID, MD and OD regions can be pre-selected based on the particular geometric design of the disk drive's actuator and disk to assure that the proper tracks are accessed by the different sensors, as shown in FIG. 8. For example, the MD range could be selected to be when the head is at a radial position corresponding to a skew angle θ of between $-\theta_m/2$ and $+\theta_m/2$.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A two-dimensional magnetic recording (TDMR) disk drive comprising:
   a rotatable magnetic recording disk having a plurality of concentric data tracks having a track pitch TP, the disk having an inside diameter (ID) region, a mid-diameter (MD) region and an outside (OD) diameter region;
   a multi-sensor read head for generating readback signals from the data tracks;
   a rotary actuator for moving the head in a generally arcuate path across the data tracks, wherein the head has a skew angle (A) relative to an along-the-track direction as a function of radial position;
   wherein the multi-sensor read head comprises:
      a head carrier having a surface for facing the disk and a trailing surface generally orthogonal to the disk-facing surface;
      a bottom magnetic shield on the trailing surface;
      a first read sensor on the bottom magnetic shield for reading a target track;
      a first magnetic shield on the first read sensor;
      a second read sensor on the first magnetic shield for reading a track adjacent to the target track when θ is zero;
      a second magnetic shield on the second read sensor;
      a third read sensor on the second magnetic shield and aligned laterally with the first read sensor in a direction substantially parallel to the trailing surface, the third read sensor being spaced a distance D from the first read head in a direction substantially orthogonal to the trailing surface, wherein D is related to TP and a maximum skew angle ($\theta_m$); and
      a top magnetic shield on the third read head; and
   circuitry responsive to the radial position of the multi-sensor read head for selecting two of the sensors as active sensors for providing readback signals, the circuitry including switch means for selecting the first and second sensors as the active sensors when the head is located in the MD region, and for selecting the first and third sensors when the head is located in the ID and OD regions.

2. The disk drive of claim 1 wherein the second read sensor is spaced a distance D/2 from the first read sensor in a direction substantially orthogonal to the trailing surface.

3. The disk drive of claim 1 wherein D is substantially equal to $(TP)/\sin \theta_m$.

4. The disk drive of claim 1 wherein D is substantially equal to $(TP-\delta)/\sin \theta_m$, wherein δ is a predetermined tolerance in the lateral alignment of the third read sensor relative to the first read sensor.

5. The disk drive of claim 1 wherein the three sensors have substantially the same lateral width in a direction parallel to the trailing surface.

6. The disk drive of claim 1 wherein at least one of the three sensors has a lateral width greater than TP in a direction parallel to the trailing surface.

7. A system for providing readback signals from adjacent data tracks in a two-dimensional magnetic recording (TDMR) disk drive having a rotary actuator with a maximum skew angle ($\theta_m$) and a disk having an inside diameter (ID) region, a mid-diameter (MD) region, an outside (OD) diameter region, and a track pitch (TP), the system comprising:
   a multi-sensor read head comprising:
      a head carrier having a surface for facing the disk and a trailing surface generally orthogonal to the disk-facing surface;
      a bottom magnetic shield on the trailing surface;
      a first read sensor on the bottom magnetic shield;
      a first magnetic shield on the first read sensor;
      a second read sensor on the first magnetic shield and spaced laterally a distance X from the first read sensor in a direction substantially parallel to the trailing surface, wherein X is related to TP;
      a second magnetic shield on the second read sensor;
      a third read sensor on the second magnetic shield and aligned laterally with the first read sensor in a direction substantially parallel to the trailing surface, the third read sensor being spaced a distance D from the first read sensor in a direction substantially orthogonal to the trailing surface, wherein D is related to $\theta_m$; and
      a top magnetic shield on the third read sensor; and
   a preamplifier connected to the multi-sensor read head for simultaneously providing a readback signal from a target track and a readback signal from a track adjacent to the target track, the preamplifier including circuitry for selecting the first read sensor to provide the readback signal from the target track and the second read sensor to provide the readback signal from an adjacent track when the multi-sensor read head is located in the MD region, and for selecting the first read sensor to provide the readback signal from the target track and the third read sensor to provide the readback signal from an adjacent track when the multi-sensor read head is located in the ID and OD regions.

8. The system of claim 7 wherein the second read sensor is spaced a distance D/2 from the first read sensor in a direction substantially orthogonal to the trailing surface.

9. The system of claim 7 wherein D is substantially equal to $(TP)/\sin \theta_m$.

10. The system of claim 7 wherein D is substantially equal to $(TP-\delta)/\sin \theta_m$, wherein δ is a predetermined tolerance in the lateral alignment of the third read sensor relative to the first read sensor.

11. The system of claim 7 wherein the three sensors have substantially the same lateral width in a direction parallel to the trailing surface.

12. The system of claim 7 wherein at least one of the three sensors has a lateral width greater than TP in a direction parallel to the trailing surface.

* * * * *

UNITED STATES PATENT AND TRADEMARK OFFICE
CERTIFICATE OF CORRECTION

PATENT NO.         : 9,099,125 B1
APPLICATION NO.    : 14/513320
DATED              : August 4, 2015
INVENTOR(S)        : Hattori et al.

Page 1 of 1

It is certified that error appears in the above-identified patent and that said Letters Patent is hereby corrected as shown below:

In the Claims

Column 9, line 12, Claim 1, delete "(A)" and replace with -- ($\theta$) --.

Signed and Sealed this
Twenty-ninth Day of September, 2015

Michelle K. Lee
*Director of the United States Patent and Trademark Office*